United States Patent [19]
Titus

[11] 3,797,662
[45] Mar. 19, 1974

[54] PRESSURE-FILTERING APPARATUS AND FILTERING METHOD

[76] Inventor: Hans-Joachim Titus, Von-Hees-Strasse 5, 6148 Heppenheim, Germany

[22] Filed: Nov. 8, 1971

[21] Appl. No.: 196,370

[30] Foreign Application Priority Data
Nov. 9, 1970 Germany............................ 2054968

[52] U.S. Cl.................... 210/78, 210/342, 210/360, 210/394, 210/403
[51] Int. Cl............................................. B01d 21/26
[58] Field of Search ....... 210/78, 81, 203, 211, 217, 210/326, 342, 380, 394, 403, 329, 360, 360 A

[56] References Cited
UNITED STATES PATENTS
1,262,146 4/1918 Ward ............................. 210/360 A
2,752,043 6/1956 Van Riel............................. 210/78
FOREIGN PATENTS OR APPLICATIONS
1,218,903 5/1960 France................................ 210/385

Primary Examiner—Frank A. Spear, Jr.
Assistant Examiner—F. F. Calvetti
Attorney, Agent, or Firm—Bacon & Thomas

[57] ABSTRACT

An apparatus and method for pressure-filtering suspensions inside a filter chamber to separate them into liquor and solids in a continuous operation, the apparatus consisting essentially of two concentrically journalled oppositely rotating filter drums forming an annular filter chamber between their walls, the pressurized suspension being fed into the filter chamber via a feed chamber and an axial, annular feed duct between the drum shafts, the dried product cake being similarly discharged via an axial, annular discharge duct between the drum shafts and a discharge chamber. The apparatus may include a washing zone in the filter chamber being supplied with pressurized washing liquid through the inside of the inner filter drum.

17 Claims, 2 Drawing Figures

Fig.1

PRESSURE-FILTERING APPARATUS AND FILTERING METHOD

BACKGROUND OF THE INVENTION

1. Field of the Invention

The present invention relates to filtering devices and methods, and in particular to pressure-filtering devices in which filterable suspensions are separated in a filter chamber under pressure into liquor and solids.

2. Description of the Prior Art

In the prior art of filtration technology are known several filtering methods and a number of devices for the industrial application of these methods. For easily filterable suspensions, one normally uses a filter centrifuge to separate them into liquor and solids. However, for suspensions which are more difficult to filter, one has to resort to filter presses, vacuum filters, or rotary filters.

The known filtering devices, almost without exception, have the shortcoming that they require batch operation because they cannot be operated continuously; many of them are not gastight; and the low upper limits on the applicable filtering pressures frequently give unsatisfactory results in terms of liquor removal.

In the case of filter presses in particular, several workers have to be assigned to remove the product from the filter frame after termination of filtration, to meticulously clean each chamber, and to prepare the filter press for the next load. Frequently it is also necessary to use water to wash the device, while a solvent would be quicker and more effective because the vapors of acids and solvents present a hazard to the operating personnel.

Filter presses have the additional disadvantage that, even though they may be charged at a nominal pressure of 15 atmospheres, the effective pressure on the cake is much lower. As the suspension is pressed into the filter chambers, the product initially deposits as a layer on the filter cloth. The product layer then grows steadily in thickness, so that the liquor of the later entering suspension has to be squeezed through the already compacted layer of product cake, thereby progressively reducing the effectiveness of the device. After termination of pressure filtering and release of the pressure, the filter cake develops cracks and openings through which the washing liquid passes with relatively little effect and without washing the cake. For this reason, it may frequently be necessary to wash the product for as long as 24 hours in order to remove all acid residues. Thus, the inadequacies of the device have to be compensated by an excessive consumption of liquid and by a lengthy operation.

Lastly, the degree of liquor extraction and concentration of product achievable with known filter presses is inadequate, because the pressures to be used are severely limited (maximum 15 at.). As a result of this limitation, the products obtained with known pressure-filtering methods contain still some 50 to 80 percent of liquid. In the case where this liquid is the leftover chemical agent which was to be removed through filtering, it becomes necessary to wash the agent out of the cake. This in turn requires a costly subsequent operation in which the chemical agent must be reclaimed from the wash water.

SUMMARY OF THE INVENTION

It is a primary objective of the present invention to provide an improved filtering method and an apparatus for its efficient application, where the following conditions are satisfied:

a. The operation is a continuous one;

b. The range of pressures applicable may vary from vacuum to as high as 100–250 at.;

c. The entire operation is gas-tight, thus permitting the use of solvents for washing without contamination of the air surrounding the apparatus;

d. The apparatus can be operated under sterile conditions, thus eliminating any risk of product adulteration;

e. Filtration itself occurs continuously and in a product layer which is maintained in controllable turbulence and thereby homogeneously intermixed so that no cracks or openings can be created in the cake and no problem exists with respect to filtering of the later entering suspension, as no dry cake layer can pack against the filter cloth;

f. While the filtering effect is greatly improved, a minimum of washing liquid is required;

g. No operating personnel is necessary because of the continuous operation;

h. In comparison to known filtering methods a ten to 30-fold increase in specific filtering efficiency is obtained;

i. The downtimes for cleaning, product removal and washing are eliminated; and j. The apparatus requires a minimum of space, while giving a high output.

In order to attain the earlier-mentioned objective and to achieve the improved conditions outlined above, the invention suggests a filtering apparatus which includes a chamber formed by two filter surfaces which move relative to one another and which are connected to a liquor outlet.

A preferred embodiment of the apparatus of the invention is characterized in that the two filtering surfaces are constituted by two concentrically journalled, oppositely rotating cylindrical filter drums which between them form an annular chamber into which the suspension enters on one axial end and from which the compacted product cake exits on the other axial end. A portion of the annular chamber may be arranged as a wash zone, whereby washing liquid is supplied through the center of the apparatus and pressed across that portion of the inner filtering surface which is located in the wash zone.

In principle, the axis of the apparatus of the invention may be oriented in any direction. In a preferred orientation which is vertical, the suspension is fed under pressure from underneath to the filter chamber via a central entry chamber which is formed by two rotary seals. The pressurized suspension advances upwardly between the two rotating filter drums where the liquor contained in the suspension escapes under pressure across the inner and outer moving filter surfaces.

Both filter drums are preferably rotated in opposite directions so that turbulence is created through the constant transverse motion of both filter surfaces relative to the pressurized product cake, thereby homogenizing the latter and preventing the formation of a stationary dry product layer. It should be understood, of course, that where special conditions exist it is also possible to maintain one of the two drums stationary, or to rotate both drums in the same sense at different speeds of rotation. In general, however, an optimal homogenization is obtained by rotating both filter drums in opposite directions. When one of the filter drums is stationary, there exists the possibility with certain products that the turbulence near the stationary filter surface is inadequate to prevent the formation of openings across the dried product layer, thus permitting free passage of the washing liquid across the product without washing the latter. Furthermore, the uneven shear resistance and viscosity of the different product layers thus created may cause the product cake to discharge from the apparatus at an irregular, pulsing rate.

The rotational drive of each filter drum is preferably independent and continuously adjustable. The continuous movement of the two filter surfaces creates frictional interference between the product cake and the filter cloth, whereby the dry cake is constantly removed from the cloth and intermixed with those parts of the suspension which are more distant from the filter surfaces and therefore contain more liquor. This method effectively prevents the creation of a dry cake layer on the filter cloth. The feed pressure of the suspension is evenly distributed over the entire chamber cross section. As most of the products being processed in this manner have thixotropic characteristics, i.e., having a structural viscosity, their viscosity is considerably lowered and the cake is kept in a liquid state through the shearing action continuously occuring between the product and the two filter surfaces. In comparison, the viscosity of a stationary cake layer of comparable liquor content which adheres to the filter cloth in considerably higher. This liquefying effect on thixotropic substances renders it unnecessary to provide additional mechanical means for advancing the cake in the axial direction. On the other hand it is easily possible to provide such advancing means on one or both filter drums, by adding for example helical ribs or drive wings to create a screw conveyor effect.

The higher feed pressures and the improved distribution of the pressure inside the filter chamber make possible a far more complete removal of the liquid agents of such suspensions as culture solutions, for example, where the liquid agent may be retained inside microcapillaries of organically formed tubular structures. This is made possible because the high feed pressure and the shearing action during filtering tend to break open these tubular structures, thereby freeing the reaction agent.

BRIEF DESCRIPTION OF THE DRAWINGS

Further special features and advantages of the invention will become apparent from the description following below, when taken together with the accompanying drawings which illustrate, by way of examples, several embodiments of the invention, represented in the various figures as follows.

DESCRIPTION OF THE PREFERRED EMBODIMENTS

Figure 1:
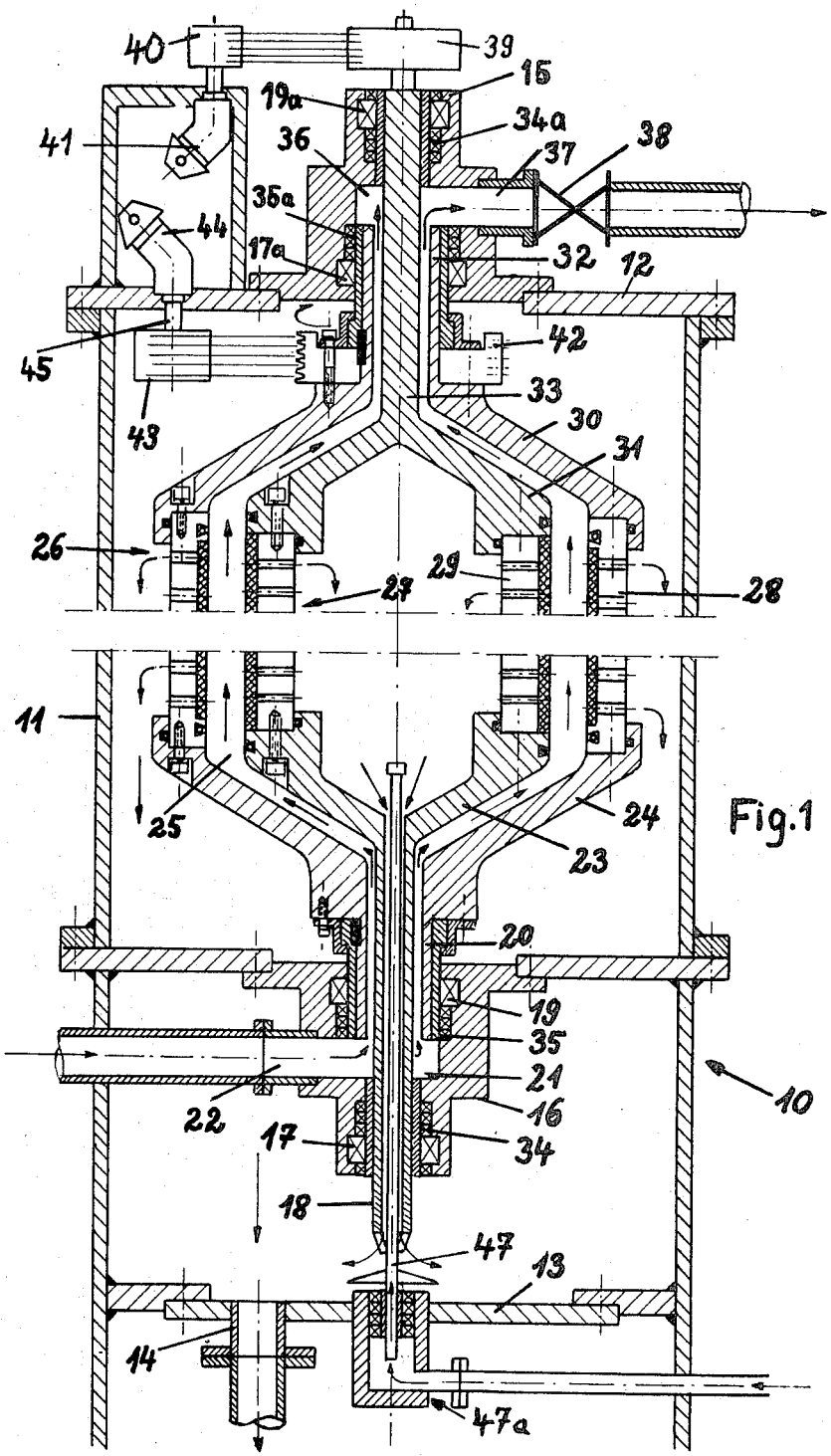
FIG. 1 shows, in a partially schematic representation, a longitudinal cross section of a filtering apparatus embodying the invention.

The example of apparatus chosen as an embodiment of the invention has a vertically oriented axis, it being understood that the operation of the apparatus would be essentially the same in any other orientation.

The apparatus of the invention includes a frame 10, a gas-tight casing 11 which carries an upper closure panel 12 and a lower collecting trough 13 with an outlet 14 acting as a funnel. In the central axis of the casing 11 are arranged two oppositely aligned journal housings 15 and 16, one mounted on the closure 12 and the other on an intermediate bottom wall above the collecting vessel 13. A self-aligning roller bearing 17 in the lower journal housing 16 supports an inner hollow shaft 18, while a second self-aligning roller bearing 19 supports an outer, shorter hollow shaft 20. Between them, the two independent hollow shafts form an annular axial feed channel which extends upwardly from an annular feed chamber 21 arranged inside the journal housing 16. Into this feed chamber 21 is fed the pressurized product suspension via a radial intake pipe 22. The journal housing 16 includes rotary seals 34 and 35 at both axial sides thereof to prevent any loss of pressurized suspension into the bearing areas or to the outside of the feed chamber. These rotary seals must be of a very reliable type, as feed pressures up to 250 atmospheres may be employed.

The two hollow shafts 18 and 20 are connected to the lower drum flanges 23 and 24, respectively, thus extending the diameter of the annular chamber between the two shafts to the diameter of the annular filter chamber 24. All corners are rounded to facilitate the advance of the suspension and to avoid the formation of deposits.

The outer filter drum 26 consists of a drum wall 28 which is perforated by a large number of transverse bores and which carries on its inner surface a supporting fabric and a filter cloth. Similarly, the concentrically spaced inner filter drum 27 has a drum wall 29 with numerous transverse holes and carries on its outer surface a supporting fabric and a filter cloth. The lower flanges 23 and 24 and similar upper flanges 30 and 31 are removably attached to the end faces of their respective drum walls 28 and 29 by a row of clamping screws, for example. Thus, the filtering surfaces become accessible for inspection and servicing by lifting the drum assembly and closure panel 12 from the casing 11 and by removing the clamping screws from the upper outer flange 30, after which the outer filter drum 26 with its lower flange 24 and hollow shaft 20 can be removed from the drum assembly, thereby giving convenient access to both filter surfaces.

The liquid leaving the filter chamber radially outwardly drips downward over splash plates and guide panels (not shown) and along the wall of the casing 11, being collected underneath in the collecting trough 13. The liquid leaving the filter chamber radially inwardly also flows downward, but inside the hollow shaft 18 from where it discharges into the collecting trough 13. The drum 27 and the inner lower flange 23 may in addition be provided with guide ribs whose purpose is to force the liquid downward against the centrifugal force which tends to retain it above the lower flange 23. In most cases, however, the pressure applied to the suspension is so high that even the centrifugal forces created by high-speed rotation can be safely neglected.

The upper end of the drum assembly is similar to the lower one in that a hollow outer shaft 32 and an inner shaft 33 extend upwardly from their respective flanges 30 and 31 into the upper journal housing 15. Between them the shafts 32 and 33 form a continuation of the annular channel which opens into an annular discharge chamber 36 which is similar to the feed chamber 21. The two shafts are again supported by self-aligning roller bearings 17a and 19a, and the discharge chamber 36 is sealed off axially in both directions by rotary seals 34a and 35a. A discharge pipe 37 extends radially from the discharge chamber 36, and a valve 38 in the discharge pipe 37 can be used to adjust the counter pressure to the feed pressure in order to pressurize the suspension, especially during startup of the filtering operation.

The inner shaft 33 extends axially beyond the upper journal housing 15 and carries on its free portion a pinion or a pulley 39 which, via a transmission drive 40, receives its motive power from an adjustable drive 41. The outer shaft also carries a pulley 42, arranged below the journal housing 15, which, via a transmission 43, is similarly connected to an adjustable drive 44. Because the outer shaft drive 42, 43 is located within the gastight casing, the drive shaft 45 of its transmission includes a rotary seal where it passes through the closure plate 12. With this arrangement the two filter drums 27 and 28 are completely independent from one another, and their direction of rotation as well as their speed can be adjusted continuously and independently.

In order to increase the concentration of the product and the rate of reclamation of the liquid reaction agent, the product discharged through the pipe 37 may be recirculated once or several times by returning it to the feed pipe 22. It is also possible to add washing liquid to the recirculating product, which permits adjustment of an optimal viscosity and consistency for the filtering operation.

Apart from the above-described possibility of recirculation, it is also possible to arrange a washing step in between filtering operations inside the filter chamber so that, during the continuous operation, the suspension is initially filtered, then washed, and subsequently filtered again as it passes upwardly through the filter chamber between the drums 26 and 27. For this purpose the apparatus as shown in FIG. 1 is provided with a wash zone (not shown) in an intermediate portion of the length of the inner filter drum 27. Such a wash zone can be created by arranging two axially spaced separation walls inside the drum wall 29 which rotate therewith. To the lower one of the two separation walls is connected a central pipe 47 through which pressurized washing liquid is supplied into the wash zone. The central pipe 47 is arranged inside the hollow inner shaft 18, rotating therewith but leaving a flow space between it and the shaft for the collecting liquor. On its lower end the rotating pipe 47 passes through a rotary seal into a connecting chamber 47a arranged below the collecting trough 13, and from there a stationary pipe leads to the outside of the apparatus.

In most filtering procedures the washing step is of major importance, and the filtering apparatus of the invention offers the possibility of continuously washing the product inside the filtering zone under high pressure and under intense movement of the product. One variant of a known washing procedure consists in plastifying the dried product cake in an agitator vessel and then again filtering the product. With the oppositely rotating filter drums of the invention it is possible to obtain such plastification in a most simple way during the travel of the product between the two filter drums. To achieve this, it may be indicated to have no perforations in the outer drum wall 28 in the length portion of the wash zone. Longitudinal adjustment of the wash zone can be provided by having a smooth cylindrical inner diameter on the inner filter drum 27, the position of the separation walls being determined by repositionable retaining rings and the walls being sealed against the drum surface by O-rings. In this case it is necessary to make the central tube 47 axially adjustable relative to the inner hollow shaft 18.

Figure 2:
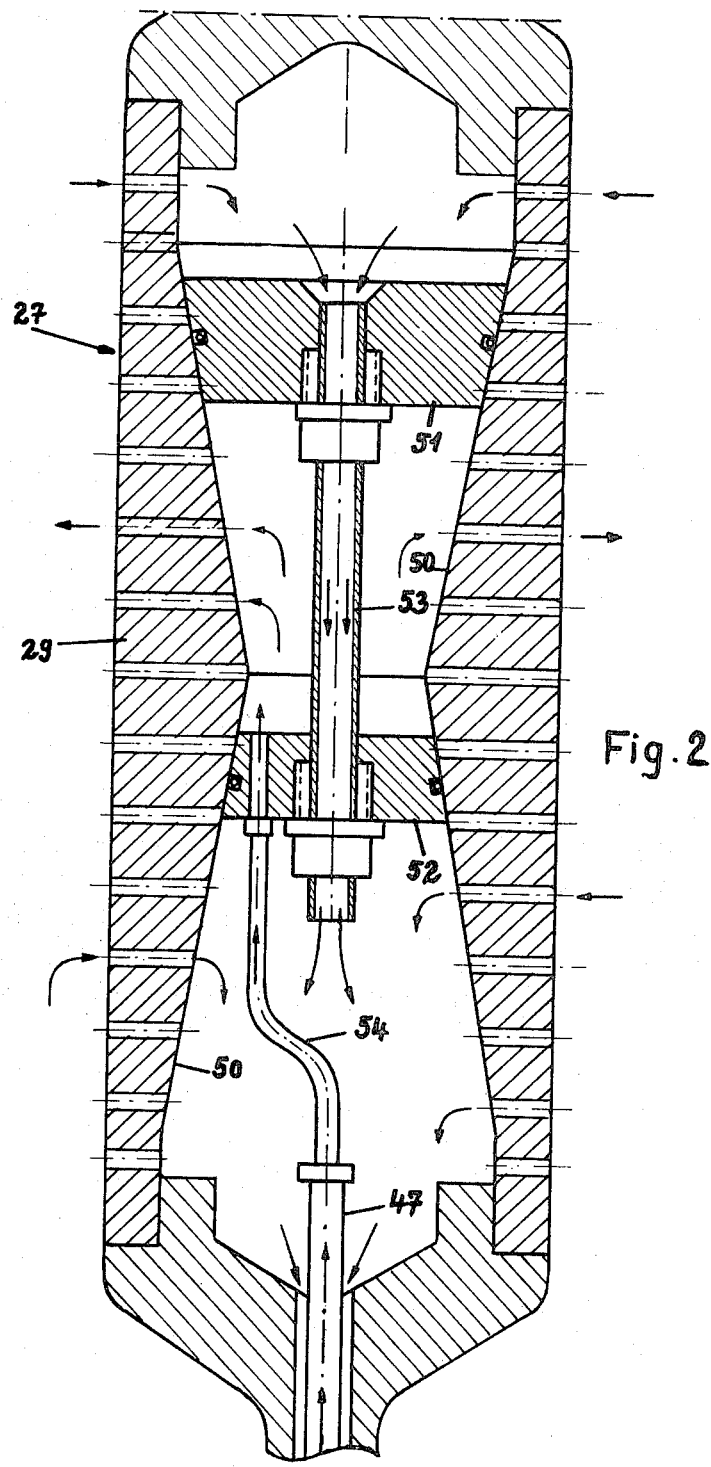
FIG. 2 shows a modified version of the inner filter drum of the apparatus of FIG. 1 including an adjustable wash zone.

In FIG. 2 is shown a modified version of the inner filter drum 27 which includes a wash zone which is adjustable in its axial position as well as in its length. For this purpose the inner diameter 50 of the drum 27 is tapered outwardly from its longitudinal midpoint in both axial directions, the taper angle as shown in the drawing being exaggerated for purposes of illustration. The end plates 51 and 52 of the wash zone are axially positioned by means of a central tube 53 with threaded clamping collars which hold them sealingly against the drum tapers 50. For a different length or axial position of the wash zone within the drum 27 it is necessary to replace the end plates 51 and 52 with similar plates of a different diameter. When the two end plates have a maximum diameter, then the wash zone occupies the entire length of the filter drum. When one end plate has a maximum diameter while the other one has a minimum diameter, then only one-half of the drum length is used for washing. Such an arrangement may then be necessary, when contact between the washing liquid and the liquor of the suspension inside the product is to be avoided.

According to FIG. 2 the washing liquid is pumped into the wash zone through the central pipe 47 and through a flexible, longitudinally adjustable hose 54 across the lower end plate 52 into the wash zone. The pressure of the washing liquid must be greater than the pressure at which the suspension is fed into the annular chamber 25 (FIG. 1). The washing liquid traverses the wall 29 of the inner drum 27 and penetrates into the product from where it escapes again through the wall 28 of the outer filter drum and above the wash zone also through the wall 29 of the inner filter drum. The liquid filtered through the inner drum wall 29 above the wash zone traverses the wash zone via the sealed central tube 53, discharging from there together with the other filtrate through the inner hollow shaft 18 (FIG. 1).

Where it is desirable, it is also possible to alternatingly arrange several wash zones and filtering zones over the length of the drums. These wash zones would be supplied with pressurized washing liquid either via a common central pipe, or via several concentrically arranged separate pipes, or also via a hollow upper inner shaft 33.

It should be understood that, although the example chosen for the illustration of the invention shows cylindrical filtering drums, the drum walls could also be other than cylindrical. For instance, they may also be in the form of other rotationally symmetric bodies or a combination thereof. Thus, an upwardly narrowing frustum shape of the outer drum 28 would give a filter chamber 25 of progressively decreasing cross section. If the decrease corresponds to the progressive reduction in product volume, a constant axial speed of product advance is obtained. When both filter surfaces are tapered, but at different angles, one obtains an annular chamber whose cross section is variable in the axial direction, thereby permitting adjustment of the shear action and viscosity under turbulence to optimal values, when thixotropic substances are processed.

What is claimed is:

1. A pressure-filtering apparatus for the separation of a suspension into dried solid product and liquor in a continuous operation, the apparatus comprising:
    a. a filter chamber defined by perforated walls in an inner and outer filter drum, said drums being concentrically arranged;
    b. a feed connection and a discharge connection communicating with said filter chamber;
    c. a hollow inner shaft extending from said inner drum, said hollow inner shaft being adapted to permit discharge of liquor collecting inside said inner drum;
    d. first and second hollow outer shafts extending from said outer drum, said inner shaft being concentrically disposed within said first outer shaft to form an annular channel, said annular channel and said second hollow outer shaft each effecting communication between said filter chamber and one of said connections;
    e. means for moving said drums relative to one another thereby creating turbulence and a mixing action in the suspension while the liquor is being filtered out under pressure.

2. An apparatus as defined in claim 1, further comprising:
    means for washing the product inside the filter chamber by forcing pressurized washing liquid through one of the filtering walls;
    the filter chamber including a wash zone occupying a distinct portion of the chamber, the washing means being connected to the wash zone.

3. An apparatus as defined in claim 1, wherein said inner and outer filter drum are coaxially journalled;
    the feed connection includes a feed chamber communicating with the filter chamber, the feed chamber being axially sealed off by means of rotary seals;
    the discharge connection including a discharge chamber also communicating with the filter chamber and similarly sealed off by means of rotary seals; and
    the moving means being constituted by drive means arranged to rotate the filter drums relative to one another.

4. An apparatus as defined in claim 3, wherein
    the inner filter drum includes flanges attached to the drum ends and inner drum shafts coaxially extending from each flange, at least one of these shafts being hollow to permit discharge of the liquor collecting inside the inner filter drum, both inner drum shafts being journalled at an axial distance from their respective flanges, and one inner drum shaft end being connected to the drive means;
    the outer one of the two filter drums includes likewise flanges attached to the drum ends, said first and second outer drum shafts coaxially extending from each flange, the outer drum shafts being shorter than the inner drum shafts, both outer drum shafts being journalled near their respective flanges so as to leave an axial space between them and the inner shaft journals on each side of the drums, these axial spaces being part of the feed chamber and discharge chamber, respectively; the shafts and flanges of the drums being radially spaced from one another to form a continuous annular axial channel for the flow of material into and out of the filter chamber, respectively, as part of the feed and discharge connections; one outer drum shaft being connected to the drive means.

5. An apparatus as defined in claim 4, wherein
    the journals for the inner and outer drum shafts are contained in stationary journal housings on each side of the drums, one of the two journal housings enclosing the feed chamber between the journals and a stationary feed pipe opening into the feed chamber, the other journal housing enclosing a similar discharge chamber and stationary discharge pipe.

6. An apparatus as defined in claim 3, further comprising
    a gas-tight stationary casing surrounding the filter drums and carrying the drum journals;
    a gas-tight liquor-collecting receptacle connected to the casing so as to communicate with the outer liquor-discharge area surrounding the outer drum as well as with the inner liquor-discharge area inside the inner drum; and
    a liquor-discharge conduit to continuously remove the accumulated liquor.

7. An apparatus as defined in claim 6, wherein
    the axis of the each filter drum is vertical;
    the casing includes a bottom panel which carries a journal housing with the lower drum journals and the feed chamber arranged in the journal housing;
    the casing further includes an upper closure panel which carries a similar journal housing with the upper drum journals and the discharge chamber arranged therein;
    the liquor-collecting receptacle is mounted underneath the bottom panel of the casing so as to surround the lower journal housing, the liquor discharging from the outer filter drum passing through apertures in the bottom panel into the receptacle, while the liquor discharging from the inner filter drum passes via a sealed axial passageway from the inside of the drum across the lower journal housing into the same receptacle.

8. An apparatus as defined in claim 3, wherein
    the common length of the concentric filter drums is subdivided into at least one filtering zone and one wash zone of predetermined lengths, the wash zone being formed by two axially spaced transverse separation walls sealingly arranged in the cavity of the inner drum;
    the apparatus further includes means for supplying highly pressurized washing liquid to the wash zone, so as to force the washing liquid through the perforated wall of the inner filter drum into the pressurized product flowing through the filter chamber.

9. An apparatus as defined in claim 8, wherein
    the common length of the concentric filter drums includes two filtering zones and an intermediate wash zone; the length and longitudinal location of the wash zone being adjustable through axial repositioning of the transverse separation walls; the interior liquor discharge areas of the inner filter drum in the filtering zone being connected to one another by means of a sealed duct extending across the wash zone.

10. An apparatus as defined in claim 8, wherein the common length of the concentric filter drums includes several filtering zones and several wash zones in longitudinal alternation.

11. An apparatus as defined in claim 8, wherein the washing liquid supply means includes a supply pipe sealingly extending from the outside of the drums into the washing zone along the drum axis.

12. An apparatus as defined in claim 8, wherein the wall of the inner filter drum has an inner diameter which increases in a taper from the longitudinal midpoint of the drum to both drum ends; and the transverse separation walls forming the wash zone are axially positioned by clamping them against oppositely tapering drum wall portions.

13. A method of pressure-filtering a suspension so as to separate it into dried solid product and liquor comprising the steps of:
pressurizing the suspension between two opposite perforated filtering walls of a filter chamber;
moving the two filtering walls in opposite directions to one another at a substantially constant distance from one another so as to create a shearing action and turbulence-induced mixing action in the suspension, while the liquor is forcibly filtered from it.

14. A filtering method as defined in claim 13, further comprising the step of
continuously feeding a pressurized suspension into the filter chamber on one of its extremities; and
continuously discharging the dried product cake from the filter chamber on its opposite extremity.

15. A filtering method as defined in claim 14, further comprising the step of
continuously washing the product during filtering by forcibly injecting washing liquid into a portion of the filtering chamber.

16. A filtering method as defined in claim 14, further comprising the step of
recirculating at least a portion of the continuously discharged product cake into the filter chamber; and
washing the product cake to be recirculated before it is re-introduced into the filter chamber.

17. A pressure-filtering apparatus for the separation of a suspension into dried solid product and liquor in a continuous operation, the apparatus comprising:
a. a filter chamber defined by perforated walls in an inner and outer filter drum, said drums being concentrically arranged;
b. a feed connection and a discharge connection communicating with said filter chamber;
c. a liquor outlet means in the apparatus;
d. a first drive means coupled with said inner drum for rotating said inner drum in one direction;
e. a second drive means coupled with said outer drum for rotating said outer drum in a direction opposite to the direction of rotation of said inner drum; thereby creating turbulence and a mixing action in the suspension, while the liquor is being filtered out under pressure.

* * * * *